United States Patent [19]
Pfiffner

[11] Patent Number: 6,099,237
[45] Date of Patent: Aug. 8, 2000

[54] HANDLING DEVICE

[75] Inventor: Karl Richard Pfiffner, Buehlhaldenweg 3, CH-8135 Langnau am Albis, Switzerland

[73] Assignee: Karl Richard Pfiffner, Thalwil, Switzerland

[21] Appl. No.: 09/089,361

[22] Filed: Jun. 3, 1998

[30] Foreign Application Priority Data

Jun. 10, 1998 [CH] Switzerland .............................. 1397/97

[51] Int. Cl.⁷ .................................................. B25J 18/04
[52] U.S. Cl. .............................. 414/744.3; 901/6; 901/16
[58] Field of Search .................................. 401/6, 16, 11; 414/749, 750, 744.3

[56] References Cited

U.S. PATENT DOCUMENTS

| | | | |
|---|---|---|---|
| 3,456,814 | 7/1969 | Bautz ........................................ | 901/11 |
| 3,751,997 | 8/1973 | Owen, Jr. et al. ...................... | 414/750 |
| 3,870,164 | 3/1975 | Haase . | |
| 4,061,232 | 12/1977 | Sickles .................................... | 414/750 |
| 4,360,724 | 11/1982 | Ritter et al. ............................. | 414/750 |
| 4,378,482 | 3/1983 | Tucker .................................... | 414/750 |
| 4,666,367 | 5/1987 | Sticht . | |
| 4,783,904 | 11/1988 | Kimura . | |
| 5,059,089 | 10/1991 | Kocaoglan .............................. | 414/750 |
| 5,205,026 | 4/1993 | Sticht . | |
| 5,542,168 | 8/1996 | Best . | |

FOREIGN PATENT DOCUMENTS

| | | |
|---|---|---|
| 1237005 | 3/1967 | Germany . |
| 4111545A1 | 10/1992 | Germany . |

*Primary Examiner*—Gregory A. Morse
*Attorney, Agent, or Firm*—Venable; Robert Kinberg; Eric J. Weierstall

[57] ABSTRACT

In order to configure a handling device, provided with an actuator for gripping a work piece, as well as at least two movement axes that are operatively connected to a drive and which allow the actuator to be positioned in different positions on a coordinate system, such that it has a relatively inexpensive design but can still be used for a multitude of purposes, a design is suggested for said handling system where the handling device is adapted to at least one work-piece carrier, provided with several workpiece holders on which a workpiece can be arranged, such that the handling device (1) is provided with means for positioning a reference point of the handling device (1) with the aid of the movement axes in such a way that it is located only in fixedly predetermined positions, so that at least in some of these positions the reference point is located respectively on one reference axis for one of the holders (31, 32, 33, 34, 35, 36, 37, 38).

15 Claims, 3 Drawing Sheets

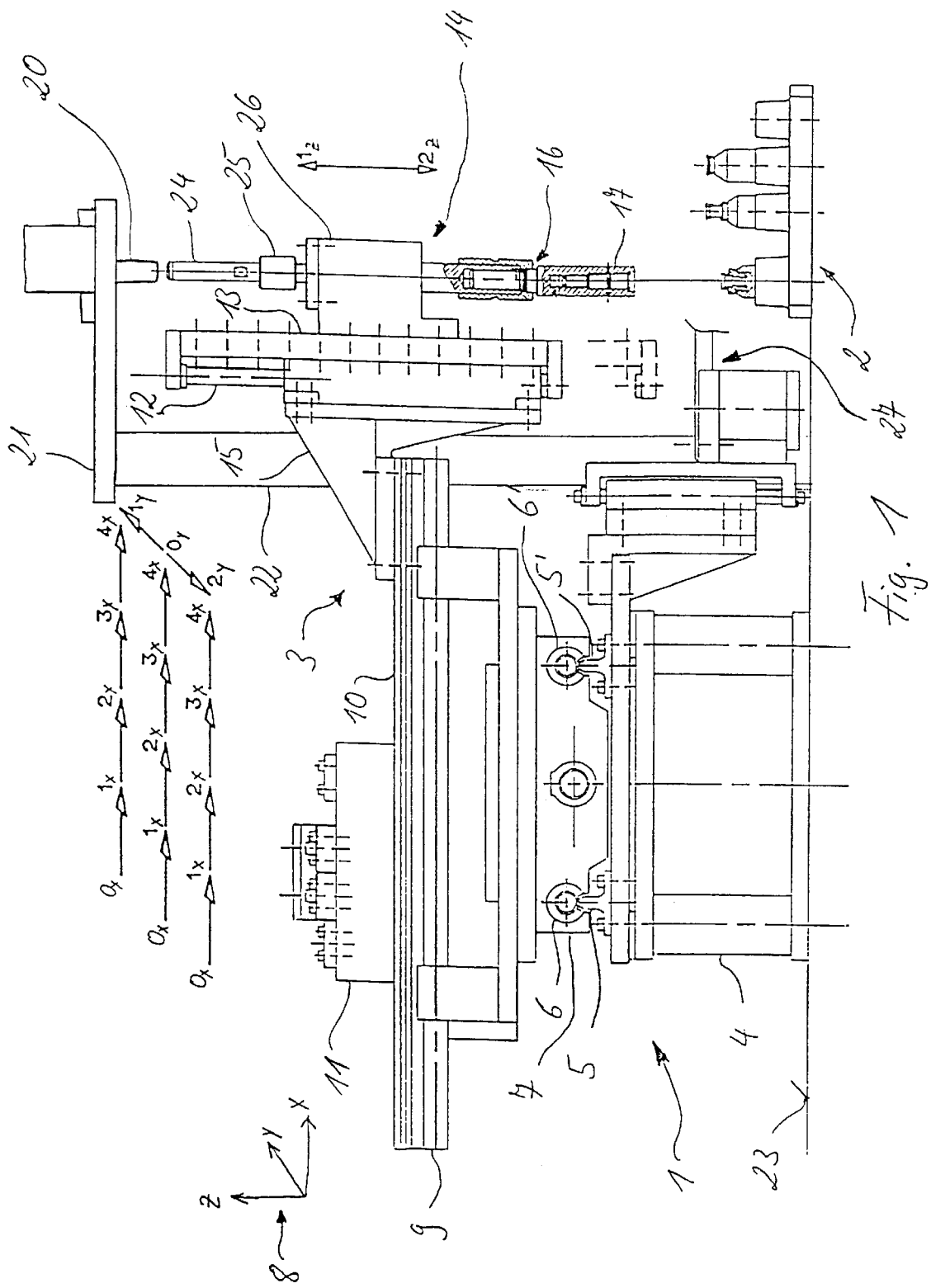

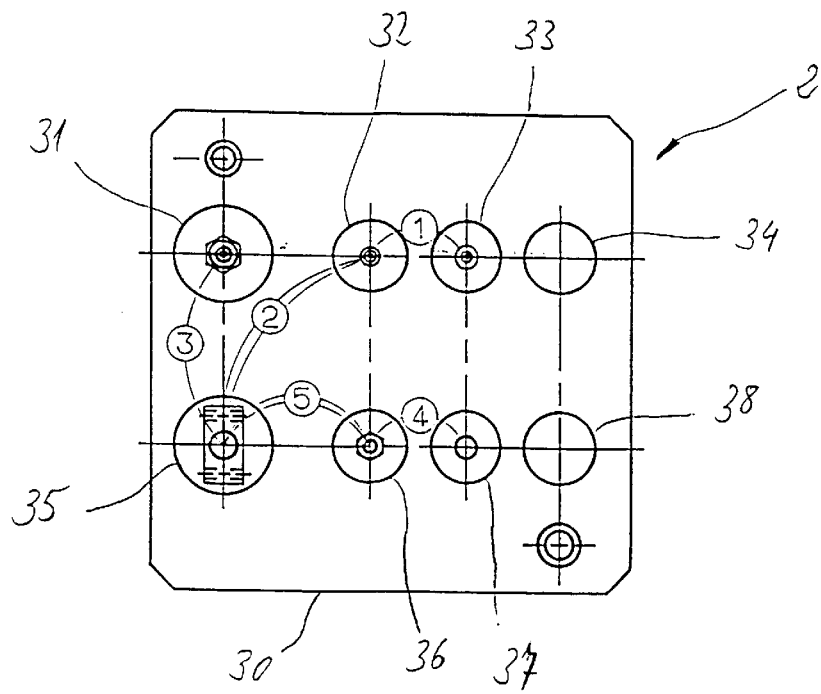
Fig. 2a
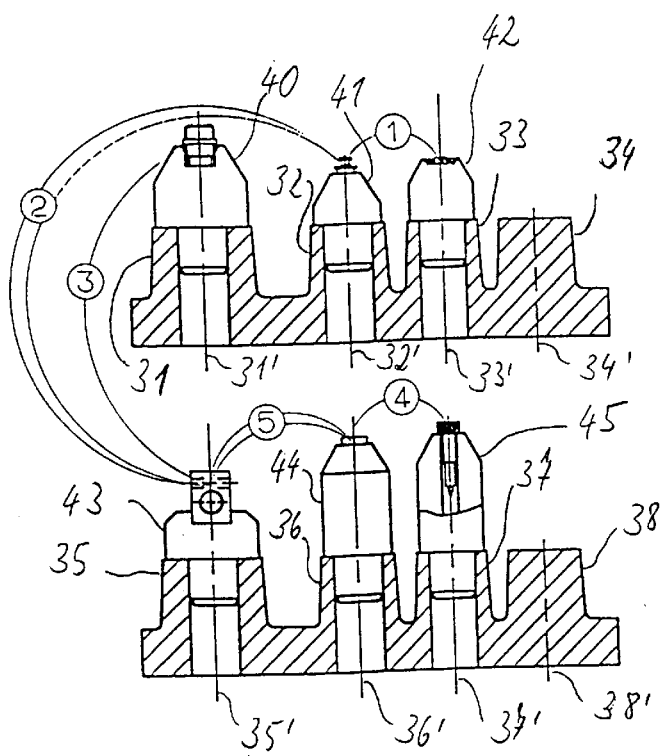
Fig. 2b
Fig. 2c

HANDLING DEVICE

BACKGROUND OF THE INVENTION

The invention concerns a handling system, comprising several handling devices and at least one workpiece carrier for holding workpieces. The handling devices for the system respectively have one actuator for assembling, joining and/or processing of a workpiece, e.g. with the aid of a gripper, and are provided with at least two movement axes, which are operatively connected to a drive and are used to position the respective actuator in varied positions on a coordinate system.

Automatic handling devices or industrial robots are frequently used for the handling and particularly the assembly of individual parts to form a product or structural component. An actuator is normally attached to the automatic handling device for this. The workpiece can be gripped, e.g. with a gripper, and if necessary can be reoriented, transported over a distance and subsequently positioned at a specific location. Tools can frequently be attached as actuators, for example for the processing through grinding.

The basic idea behind most of the known handling devices is that they should be as widely usable as possible. For that reason, said devices normally have a freely programmable control, allowing the grippers to move to any optional position within the movement range of the handling device. The handling devices are provided with numerical control (NC) axes for this. A so-called "teach-in" method is normally used to carry out assembly operations with such a handling device. With this method, the handling device is moved manually to the individual assembly points and these locations are subsequently stored.

To be sure, such known handling devices can actually be used for different applications. However, the relatively high conversion expenditure necessary for this has proven to be a disadvantage. The teach-in method in particular has turned out to be relatively time-consuming. In addition, one or several new workpiece holders must be designed, produced and integrated into the handling device for each new application.

Also, the known handling devices include several functions or options that are unnecessary for many concrete applications. This functional "overdimensioning" increases the design expenditure and thus the costs for such handling devices above the necessary level.

SUMMARY OF THE INVENTION

In order to avoid said disadvantages, among other things, handling devices have become known for which the design is adapted to a concrete application. Such adaptations can, for example, consist in that the handling device with an actuator performs only a single movement. However, the disadvantage in such cases is that the degree of reuse of such devices for other purposes is relatively low, if possible at all.

From the manufacturer's side, the previously discussed freely programmable and universally usable, handling devices and the application-specifically adapted handling devices have the disadvantage of involving a considerable design expenditure.

Thus, it is the object of the invention to provide a handling device that can be used for a variety of applications at the lowest possible cost, especially for the assembly of different products, and which still has a relatively simple design. The invention is also intended to create a handling system, comprising several handling devices that are as widely usable as possible and can still involve a low design expenditure.

The solution is comprising a handling system according to the instant application, comprising several handling devices of a different design, each of which is provided with an actuator for the assembly and/or processing of a workpiece, as well as at least two and preferably three movement axes that are operatively connected to a drive, thereby permitting the actuator to be moved to varied positions in a coordinate system, and comprising additionally at least one workpiece carrier equipped with several workpiece holders on which respectively one workpiece can be arranged, wherein the positions of the individual workpiece holders on the respective workpiece carrier, relative to each other, are fixedly determined, wherein the handling devices and the at least one workpiece carrier are coordinated with each other, wherein each handling device is provided with positioning means for this, through which a reference point for the respective handling device can be set with the aid of the movement axes only at preferably unchangeable, fixed positions, so that at least in some of these positions, the reference point is located on respectively one of the reference axes of one of the workpiece holders, wherein at least some positions of each actuator form respectively one dot matrix, preferably a three-dimensional dot matrix, and the dot matrixes of the individual handling devices are at least in part identical, thereby permitting each of the handling devices to be positioned via at least some of the workpiece holders of the at least one workpiece carrier.

This object is also solved with a handling device according to claim 13.

The actuator for handling devices according to the invention should be able to occupy only specific, predetermined positions in a coordinate system. On the one hand, this reduces considerably the design expenditure of the drives, but also that of the control. In order to achieve nonetheless a high degree of reuse, several handling devices and at least one workpiece carrier holding workpieces that are to be assembled are viewed as a system in accordance with the invention. This means that at least one workpiece carrier belongs to each handling device according to the invention. The workpiece carrier in this case can be arranged such that the individual holders are positioned exactly in the grid formed by the positions that can be occupied by the handling device. Said positions are already adjusted by the manufacturer of this device, preferably unchangeable. The adaptation ensures the user that the handling system can be used for a new application without requiring considerable conversion operations and without requiring extensive reprogramming. The user must only specify the number and sequence of the positions to be occupied, as well as the functions, e.g. of the gripper, to be carried out there. Assembly and joining sequences can be planned, prepared and carried out with particular ease in this way, wherein the terms "assembly" and "joining" must be understood to be at least the processes listed in the DIN 8593.

Such a standardized development of handling devices and the associated workpiece holders provides the user with a high product flexibility and variant flexibility with respect to the options for using the handling systems according to the invention. In addition, this also permits placing outside orders with less expenditure than required so far, e.g. in case of capacity bottlenecks. When placing such an order, the client can time provide the contractor taking the order with the necessary documents, already available to the client, which explain how to arrange the handling system to carry out said order. These operational plans, control programs, and the like can be used directly by the contractor taking the order as said contractor is using the same, standardized handling system. Owing to a universal use capability of the handling system according to the invention, contractors can buy such handling systems for their equipment without being bound to a specific order or client placing the order.

However, the system concept according to the invention also has essential advantages for the manufacturer. Thus, it is possible for a manufacturer to have a completely modular structuring of the program. On the one hand, this permits the assembly of handling modules with the same structural design and configuration, so that various types of machines can be configured for different uses by using the standardized handling modules and workpiece carriers. Such a handling module can be, for example, a component of the handling devices according to the invention, which comprises at least one of the movement axes X, Y and Z. The handling modules can then be combined, for example, with different actuators.

On the other hand, it is also possible to configure handling systems with little expenditure by using handling modules or handling devices having a different design. Design differences between handling devices can include, for example, different types of drives for the individual axes, varied carrying capacity for the handling devices or even providing different actuators. Of course, such differences can also include any other aspect that is relevant for the use of handling devices. However, such handling devices belonging to a system should have dot-matrix grids for the positions to be occupied, which coincide at least in part, but preferably completely. The structural expenditure, the production costs, as well as the time required to put the individual machines in operation can be reduced considerably owing to the reduction resulting from the modular design in the number of individual parts required for the various models and the set-up expenditure.

In view of the modular configuration of a handling system according to the invention, it has proven useful if handling devices with a different structural design have a type of "basic matrix" for jointly occupied positions, which can be occupied by all handling devices. The handling system can comprise handling devices, which can only occupy the basic matrix positions as well as other handling devices that can be arranged in positions other than the basic matrix.

The handling device for preferred embodiments of the invention can be moved to several, preferably at least four, positions in a X-Y plane. With respect to a Z-axis, that is to say in vertical direction, the actuator end provided with a gripper can be moved to two end positions, namely an upper and a lower end position. In a cartesian coordinate system this consequently results in at least eight locations for positioning the manipulator arm. It is preferable in this case if at least one of the positions is located outside of the workpiece carrier.

According to another practical embodiment of the invention, several handling devices are chained together, e.g. in the form of a rectilinear transfer system. If handling devices according to the invention are combined to form a rotary transfer system, these can be arranged around a transfer device that is designed as an indexing table.

Additional preferred embodiments of the invention follow from the dependent claims.

The invention is explained further with the aid of exemplary embodiments, shown diagrammatically in the figures, which show in:

BRIEF DESCRIPTION OF THE DRAWINGS

FIG. 1 A view from the side of a handling device and a workpiece carrier for a handling system according to the invention;

FIGS. 2a) to 2c) A view from above of the workpiece carrier in FIG. 1, as well as two sectional views of the same;

DETAILED DESCRIPTION OF THE DRAWINGS

Figure 3:
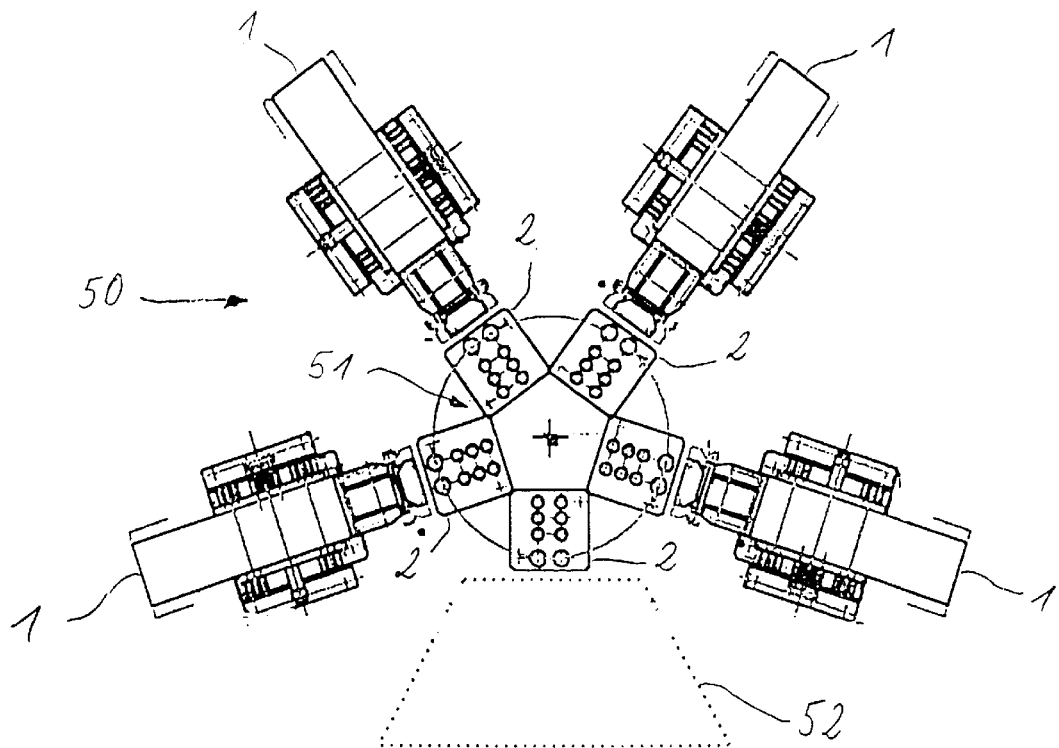
FIG. 3 A view from above of a rotary transfer system according to the invention.

The handling system shown in FIG. 1 comprises an illustrated handling device 1, one or several additional handling devices that are not shown and a workpiece carrier 2. The handling device 1 itself is provided with a handling module 3, arranged on a frame 4.

Two toothed guide rails 5, 5' are arranged parallel to each other on the frame 4. Respectively one recirculating ball spindle 6, 6' engages in the guide rails 5, 5'. The two recirculating ball spindles 6, 6' are also aligned parallel to each other and attached to a bearing plate 7. FIG. 1 does not show an electric drive for the two spindles 6, 6', which can be moved translatory in Y direction of a Cartesian coordinate system 8.

Another guide rail 9 is attached to an arrangement on the bearing plate 7, the longitudinal axis of which corresponds to a X-axis of the coordinate system 8. A slide 10 is arranged such that it can move back and forth on the guide rail, said slide having a valve island 11, an actuator 14 as well as its bearing element 15 and a non-depicted pneumatic drive attached to it.

The actuator 14 can be moved in the Z-direction of the coordinate system via a Z-axis 12 and can be moved to an upper and a lower end position and locked in place there. A holding flange 13 of actuator 14 is provided with a bore diagram, indicated in FIG. 1 with horizontal dashed lines. Owing to the bore diagram, the actuator 14 can be secured at different levels, relative to the bearing body 15. A pneumatically operated tool 17 is attached at the lower end of the actuator 14, such that it can be detached and replaced with the aid of a coupling device 16.

In addition to the Z-axis 12 itself, the actuator 14 shown in the illustrated embodiment can also be moved by a press-in cylinder 20 that can be moved in Z-direction. The press-in cylinder 20 is attached to one side of a support ring 21. On the diametrically opposite side, the support ring 21 rests on a fastening column 22, which is also arranged on a base surface 23, the same as the workpiece carrier 2 and the frame 4. The press-in cylinder 20, e.g. operated pneumatically or hydraulically, pushes onto an axis extension 24 of tool 17. A ring-shaped end stop 25 is arranged on the axis extension 24, which end stop limits the downward movement of the press-in cylinder 20 by coming to rest against a recess 26 in the axis extension 24. In Z-direction toward the top, the movement of the cylinder is limited by the upper end position of its piston. The tool 17 thus can be positioned in Z-direction in two additional end positions, owing to the press-in cylinder 20.

Above all, the movement of press-in cylinder 20 can be used for the actual joining and processing movement, whereas the movement of the Z-axis 12 serves first of all to pre-position the tool 17. The arrangement of press-in cylinder 20 on support ring 21 and the fastening column 22 makes it possible to achieve a favorable flow of power, particularly during joining movements or other handling operations that require a certain force to be exerted. The flow of power resulting from the arrangement shown is from the press-in cylinder 20 via the axis extension 24, the tool 17, the workpiece carrier 2, the base surface 23, the fastening column 22 and the support ring 21 back to the press-in cylinder 20, therefore making it a closed circuit. Based on this arrangement, the force exerted by the press-in cylinder 20 onto a workpiece does not influence the X-, Y- and Z-axis and also does not cause deformations of the handling device 1.

A partially shown holding-down device 27 is attached to the frame 4 and can also be moved in Z-direction. Said holding-down device 27 can be used to hold a workpiece in the workpiece holder. The holding-down device could also be provided with a gripper or a joining aid. Such a joining aid for an O-ring assembly, for example, could be a cone, used to pre-deform the individual O-rings for the assembly.

A three-dimensional, dot-matrix grid is diagrammatically indicated in FIG. 1 through arrows and position numbers, which corresponds to the individual positions and forward feed paths that can be accessed by the reference point of actuator 14 or the tool 17. As can be seen, the tool can be arranged permanently in five different positions ($O_x$–$4_x$) in X-direction. In this case, $O_x$ is the X-coordinate for neutral positions in front of the workpiece carrier. With respect to the Y-axis, the tool can be changed to three positions $O_y$. $1_y$ and $2_y$. In Z-direction, the actuator positions $1_z$ and $2_z$ result from the two end positions of the reference point, created by the Z-axis 12. Thus, a three-dimensional grid is constructed with the five X-axis positions, the three Y-axis positions, as well as the two Z-axis positions. The tool or reference point in this case can be positioned such that it can occupy any point ($O_x$–$4_x$, $O_y$–$2_y$, $1_z$–$2_z$) of the matrix-type grid. The X-, Y- and Z-axes can be driven simultaneously as well as separately to move from one position to another.

The movement axes of the handling device 1 have positioning means to create this finite number of fixedly predetermined positions, which positioning means stop the forward feed movement of the corresponding axis at the predetermined location. The X-axis drive is designed as stepping motor for this. The stepping motor control is already preset during the assembly of the handling device, such that the motor respectively stops at a specific number of steps. The number of steps in this case corresponds to the forward feed movements respectively traveled between the positions $O_x$–$1_x$, $1_x$–$2_x$, . . . –$4_x$. Thus, in the case of the X-axis, the positioning means are the respectively predetermined steps of the electric motor.

Two non-depicted end stops (pneumatic piston lift), as well as an intermediate stop that is also not shown serve as positioning means for the pneumatic Y-axis. Since the Y-axis should be movable directly from one end position to another, the intermediate stop in the pneumatic cylinder of the Y-axis can be added selectively. As for the Y-axis, the pneumatic cylinder limiting the lift serves as positioning means for the Z-axis.

Of course, positioning means and drives for the individual, previously explained axes in different embodiments can also be interchanged. Drive concepts and positioning means other than those described before could also be used. Thus, it is possible to design a numerical control axis, where the programming of the NC axis for the handling device is preset or limited by the manufacturer already, in that only fixedly predetermined positions can be selected on the corresponding axis. The handling system can be completed, for example, with these varied handling devices.

FIG. 1 as well as the FIGS. 2a, 2b and 2c show that the workpiece carrier 2 is constructed as an essentially rectangualr plate 30, provided with two essentially identical rows of respectively four workpiece holders 31, 32, 33, 34, 35, 36, 37, 38. The workpiece holders 31–38 are respectively formed as one piece with the plate. The holders 31–38 with essentially cylindrical shape and identical height in Z-direction are arranged on the workpiece carrier 2 in such a way that their vertical symmetry axes 31'–38' are positioned exactly in the grid for the X-Y plane of the handling device, given a corresponding positioning of the workpiece carrier 2, relative to the handling device. In other words, the actuator 14 can be positioned in such a way, relative to each holder 31–38 that its reference point is located in a defined position relative to a reference axis, that is to say the respective symmetry axis 31' to 38' of the corresponding holder. In the exemplary embodiment shown, the reference point for the actuator is located in the region of the coupling device 16. The defined position of actuator 14 involves its reference point being arranged respectively at a specific location on the symmetry axes 31'–38'. In the X-Y plane of the coordinate system, the holders 31–34 in the first row therefore correspond to the grid points ($1_x$–$4_x$, $1_y$), whereas the holders in the second row are positioned on the grid points ($1_x$–$4_x$, $2_y$). As can be seen in particular in FIGS. 1 and 2a, workpiece holders—and thus also the actuator positions—can be arranged at a distance to each other in X-direction. Of course, the holders 31–38 for different embodiments of the invention could also be arranged at irregular distances to each other, relative to other spatial directions.

In order to have as few parts as possible that must be adapted to the concrete application case, holders 31–33, 35–37 are designed as hollow cylinders with respectively identical inside diameter, into which rapid-replacement inserts 40, 41, 42, 43, 44, 45 can be inserted to fit exactly. The inserts 40–45 on which the workpieces to be assembled are arranged, are arranged and dimensioned in such a way that an assembly is possible at the most suitable points for assembly and processing. Thus, in particular the height of the inserts 40–45 (in Z-direction), as well as the length of the tool (also seen in Z-direction), will permit an application-specific selection of the location at which a tool grips a workpiece, despite the standardized lift of the Z-axis of the handling device 1. Of course, it is also possible to use the holders directly and without additional inserts for arranging the workpiece to be handled.

The assembly sequence for the individual elements of a product, namely a valve, is indicated in FIGS. 2a–2c by the circular arrangement of reference numerals 1–5 as well as through the arrows. For this, a nut arranged in the holder 33 is first taken up by the tool 17. To do this, the actuator is moved to position ($3_x$, $1_y$, $2_z$). After the tool has been moved to the upper Z-end position ($1_z$), with initially constant X- and Y-coordinates, it is moved into position ($2_x$, $1_y$, $1_z$) above holder 32. By lowering the tool, an assembly part is inserted into the base part that is pre-positioned in the holder. This corresponds to the assembly step characterized with "1" in FIGS. 2a–2c. The components assembled in this way are then mounted (assembly step "2") on a base body held in the holder 35 ($1_x$, $2_y$). Following this, the additional assembly steps "3," "4" and "5" are performed in the same way, in that the gripper is respectively positioned above the corresponding holder and then lowered, in that it takes up the component, moves upward again, is positioned above the next holder and is lowered there for the assembly of the component or the component group.

An assembly arrangement according to the invention is shown in FIG. 3, said arrangement comprising several of the handling systems shown in FIG. 1, which are combined to form a rotary transfer system 50. With the aid of the rotary transfer system, a product that is not shown in further detail is assembled, wherein a higher number of assembly steps are required for this, than can be performed by each individual handling device 1. Each one of the workpiece carriers 2 that are attached to a central rotary indexing table 51 can be positioned in front of each handling device 1 in such a way that the holders are positioned in the grid of the corresponding handling device 1. The five workpiece carriers 2, shown in the exemplary embodiment, are distributed evenly around the circumference of the indexing table 51. In this case, respectively one of the workpiece carriers 2 can be arranged in front of a loading and unloading station 52, from which the workpiece carrier 2 can be fed manually. In order to coordinate the assembly operation, the rotary transfer system is provided with a higher order central control (not shown), which also controls the individual controls for the handling devices 1 and the indexing table 51.

What is claimed is:

1. A handling system, comprising:
   at least two handling devices with separate actuators for each handling device for at least one of assembly, joining and processing of a workpiece;
   a drive operatively connected to the handling devices to position the actuators in different positions on a coordinate system with at least two movement axes;
   at least one workpiece carrier with a plurality of workpiece holders on which a workpiece is arranged, wherein the positions of the individual workpiece holders relative to each other on the respective workpiece carrier are fixedly predetermined in the direction of at least at least one of the movement axes and the at least one workpiece carrier is addressable by a handling device;
   positioning means for the handling devices and the at least one workpiece carrier said positioning means adjusting the position of a handling device relative to the workpiece wherein the handling devices can be moved along the movement axes to an unchangeable, preset reference point for each of the respective handling devices so that the reference point is established at position which is located on a reference axis of a respective one of the workpiece holders; and
   a dot matrix for the several handling devices which is derived from said preset reference point positions for each handling device, the dot matrixes of the individual handling devices coinciding at least in part, thereby making it possible to position each of the handling devices above at least one of the workpiece holders on the at least one workpiece carrier.

2. A handling system according to claim 1, wherein the dot matrixes of the handling devices are identical, so that these handling devices can be positioned in the same way above workpiece holders for the same workpiece.

3. A handling system in accordance with claim 1, wherein at least one of the handling devices has a higher number of positions than the other handling devices that can be occupied by its respective workpiece actuator, so that all positions of handling devices having a lower number of positions can be occupied by the handling device with the higher number of positions.

4. A handling system according to claim 1, wherein the reference axes are also symmetry axes for the holders.

5. A handling system according to claim 4, wherein the symmetry axes extends parallel to each other.

6. A handling system according to claim 1, wherein the several workpiece holders are distributed in the form of a matrix on the workpiece carrier.

7. A handling system according to claim 1, wherein the positioning means are formed as end stops arranged on the movement axes.

8. A handling system according to claim 1, wherein one of the two axes is the X-axis and movement along the axis is operated pneumatically.

9. A handling system according to claim 1, further comprising:
   inserts for attaching workpieces arranged on the holders of workpiece carrier.

10. A transfer system comprising:
    an indexing table; and
    a handling system, said handling system comprising,
      at least two handling devices with separate actuators for each handling device for at least one of assembly, joining and processing of a workpiece;
      a drive operatively connected to the handling devices to position the actuators in different positions on a coordinate system with at least two movement axes;
      at least one workpiece carrier with a plurality of workpiece holders on which a workpiece is arranged, wherein the positions of the individual workpiece holders relative to each other on the respective workpiece carrier are fixedly predetermined in the direction of at least at least one of the movement axes and the at least one workpiece carrier is addressable by a handling device;
      positioning means for the handling devices and the at least one workpiece carrier said positioning means adjusting the position of a handling device relative to the workpiece wherein the handling devices can be moved along the movement axes to an unchangeable, preset reference point for each of the respective handling devices so that the reference point is established at position which is located on a reference axis of a respective one of the workpiece holders; and
      a dot matrix for the several handling devices which is derived from said preset reference point positions for each handling device, the dot matrixes of the individual handling devices coinciding at least in part, thereby making it possible to position each of the handling devices above at least one of the workpiece holders on the at least one workpiece carrier;
    wherein the indexing table is in communication with several handling devices of the handling system.

11. A transfer system according to claim 10, wherein the several handling devices are arranged in a rotary arrangement.

12. A transfer system according to claim 10, wherein the indexing table allows the workpiece carriers to be positioned so that the reference point for the handling device is located respectively on one reference axis for a holder.

13. A handling device comprising:

an actuator for gripping a workpiece;

a drive which permits movement of the actuator along at least two movement axes, which make it possible to position the actuator in different positions on a coordinate system;

positioning means, which make it possible to position a reference point of the handling device with the aid of movement axes only at fixedly predetermined, unchangeable positions, at least some positions of each actuator together forming a three-dimensional dot matrix.

14. A handling device according to claim 13, further comprising:

a press in cylinder arranged along one of the movement axes, in addition to its drive, which permits a workpiece arranged on the actuator to move into two end positions along this movement axis.

15. A handling device according to claim 14, further comprising:

a base surface and a frame supported by the base surface;

wherein, in one of the end positions, the press-in cylinder acts upon the workpiece carrier which is arranged on the base surface and that the press-in cylinder is arranged in a frame of the handling device, thereby resulting in a closed flow of power in this end position.

* * * * *